(No Model.)
6 Sheets—Sheet 1.

S. C. LISTER & J. REIXACH.
MACHINE FOR FINISHING PILE FABRICS.

No. 263,416. Patented Aug. 29, 1882.

Witnesses.
Wm A. Skinkle
Wm J. J. Fanner

Inventors.
Samuel C. Lister
José Reixach
By their Attorneys.
Baldwin, Hopkins & Payton N. PETERS. Photo-Lithographer, Washington, D. C.

(No Model.)  6 Sheets—Sheet 4.
S. C. LISTER & J. REIXACH.
MACHINE FOR FINISHING PILE FABRICS.
No. 263,416. Patented Aug. 29, 1882.

(No Model.) 6 Sheets—Sheet 5.
S. C. LISTER & J. REIXACH.
MACHINE FOR FINISHING PILE FABRICS.
No. 263,416. Patented Aug. 29, 1882.

Witnesses.

Inventors
Samuel C. Lister
José Reixach
By their Attorneys.

(No Model.)  6 Sheets—Sheet 6.

S. C. LISTER & J. REIXACH.
MACHINE FOR FINISHING PILE FABRICS.

No. 263,416.  Patented Aug. 29, 1882.

Witnesses.
Wm A. Skinkle
Wm J. Tanner

Inventors
Samuel C. Lister
José Reixach
By their Attorneys
Baldwin, Hopkins & Peyton

UNITED STATES PATENT OFFICE.

SAMUEL C. LISTER AND JOSÉ REIXACH, OF MANNINGHAM, COUNTY OF YORK, ENGLAND.

MACHINE FOR FINISHING PILE FABRICS.

SPECIFICATION forming part of Letters Patent No. 263,416, dated August 29, 1882.

Application filed December 3, 1881. (No model.) Patented in England February 10, 1880, No. 590.

*To all whom it may concern:*

Be it known that we, SAMUEL CUNLIFFE LISTER and JOSÉ REIXACH, subjects of the Queen of Great Britain, residing at Manningham, near Bradford, in the county of York, England, have invented certain new and useful Improvements in Machines for Finishing Pile Fabrics, (for which we have received Letters Patent in England, No. 590, dated 10th February, 1880,) of which the following is a specification.

Our invention relates to means for applying stiffening to the back of pile fabrics and subsequently ironing the back after the stiffening has been applied to it. The stiffening we apply in volume to the back of the fabric while the fabric is held face downward. The stiffening we apply onto the back of the fabric from an opening at the bottom of a trough, and spread the said stiffening evenly over the back of the piece by means of a knife, such knife conducting the excess of stiffening to a cistern below, from which it is again raised into the trough by a pump. After the back of the fabric has had stiffening applied to it the fabric is led over a succession of hot plates to partially dry the stiffening and bring it to a state fit for ironing. The fabric has then arrived at a part of the machine at which irons heated by gas are moved with a to-and-fro motion across the back of the piece as it is passed along, stretched, and with the face downward.

The drawings hereunto annexed show a machine for finishing the back of the pile fabrics in the manner above described.

Figure 1:
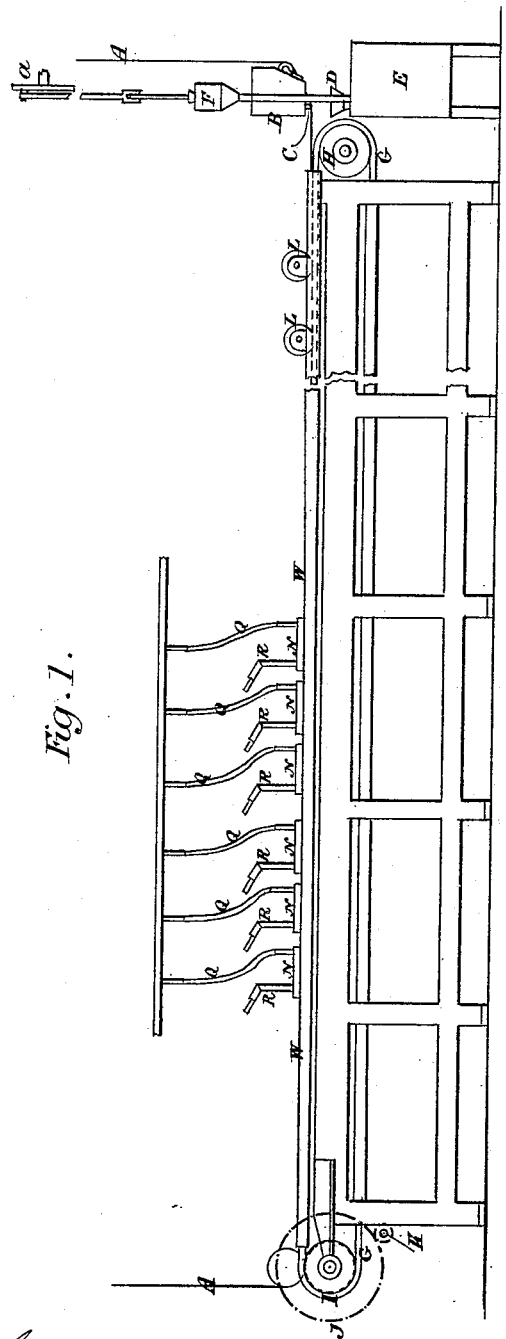
Figure 2:
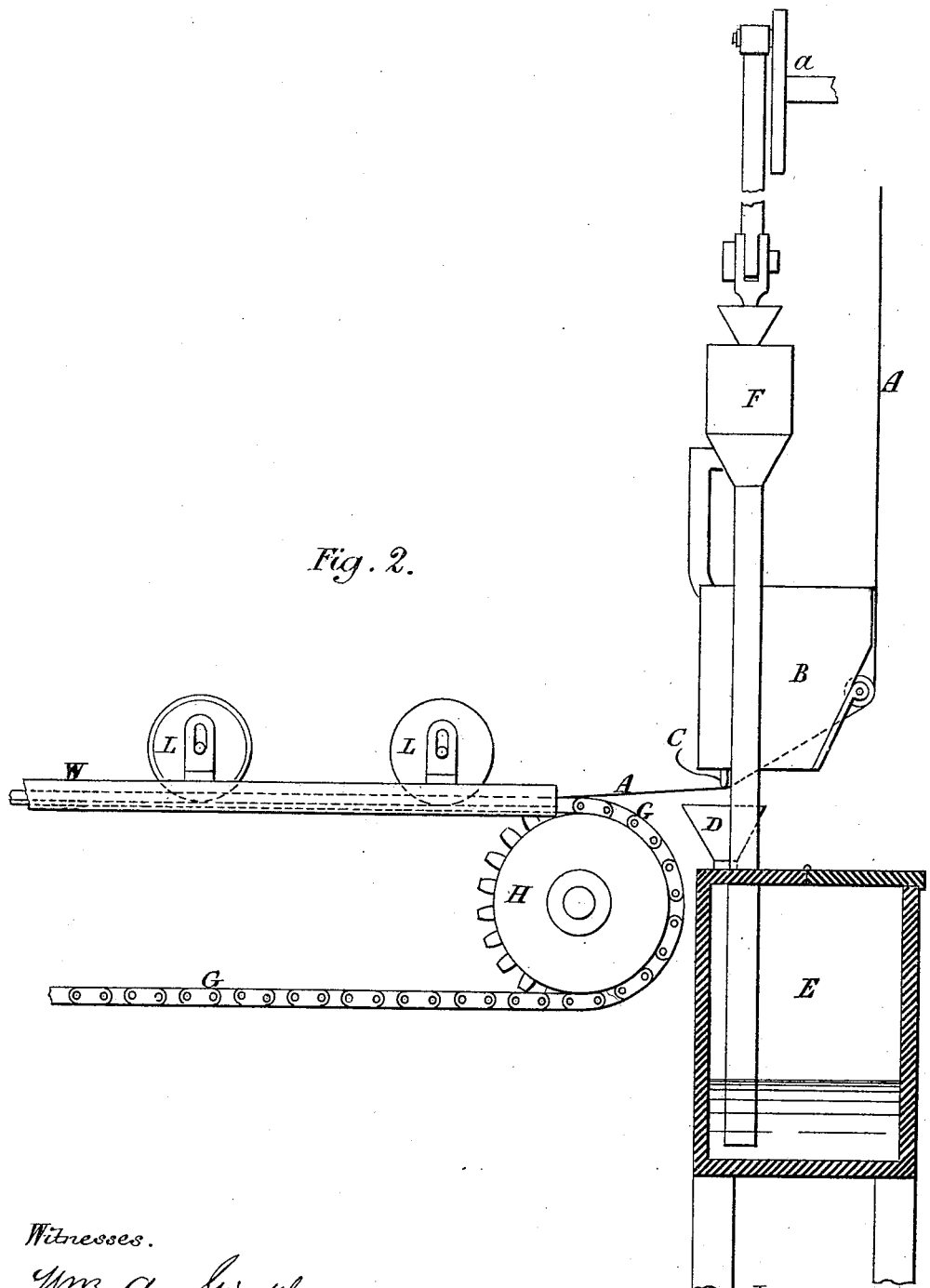
Figure 3:
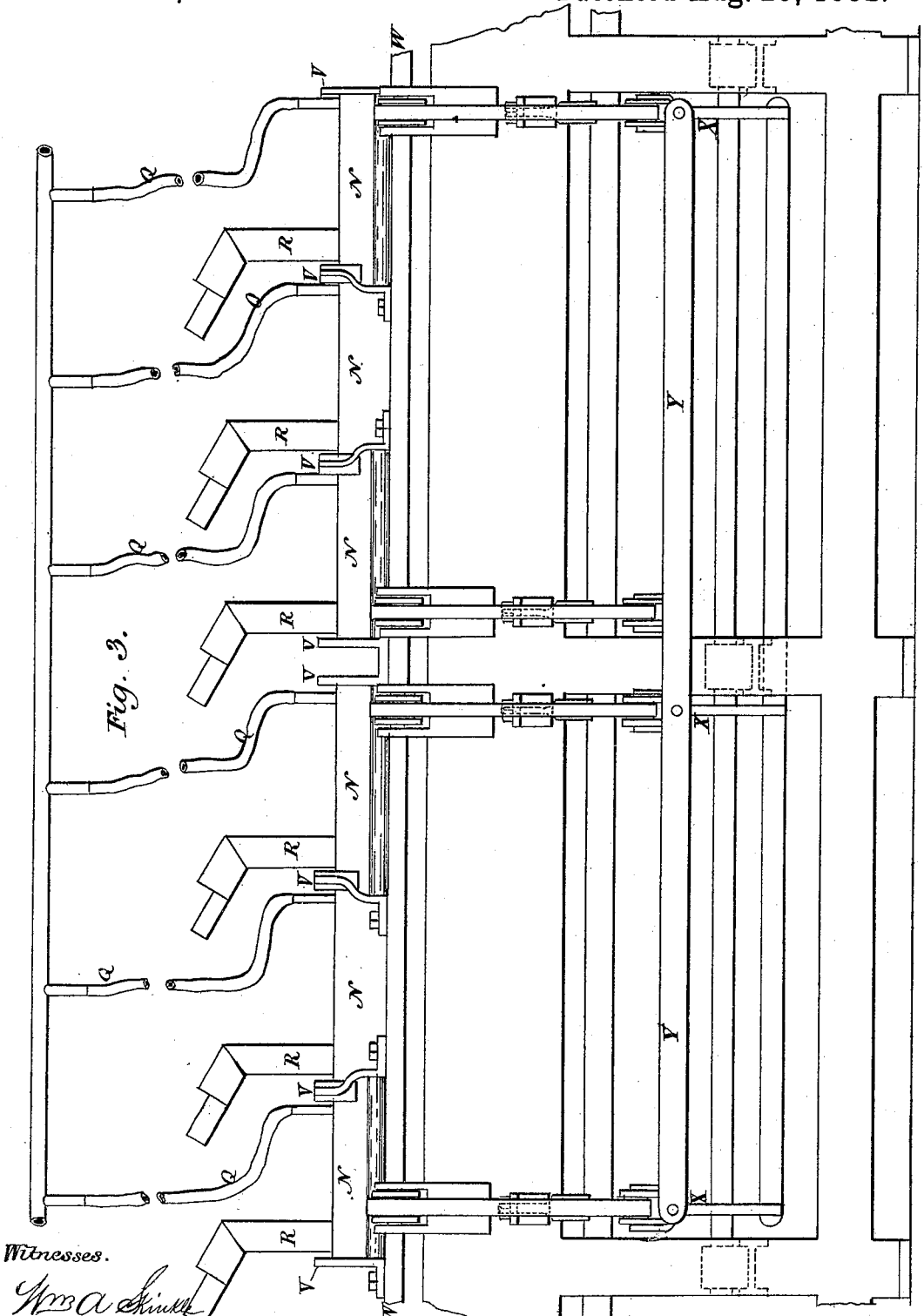
Figure 4:
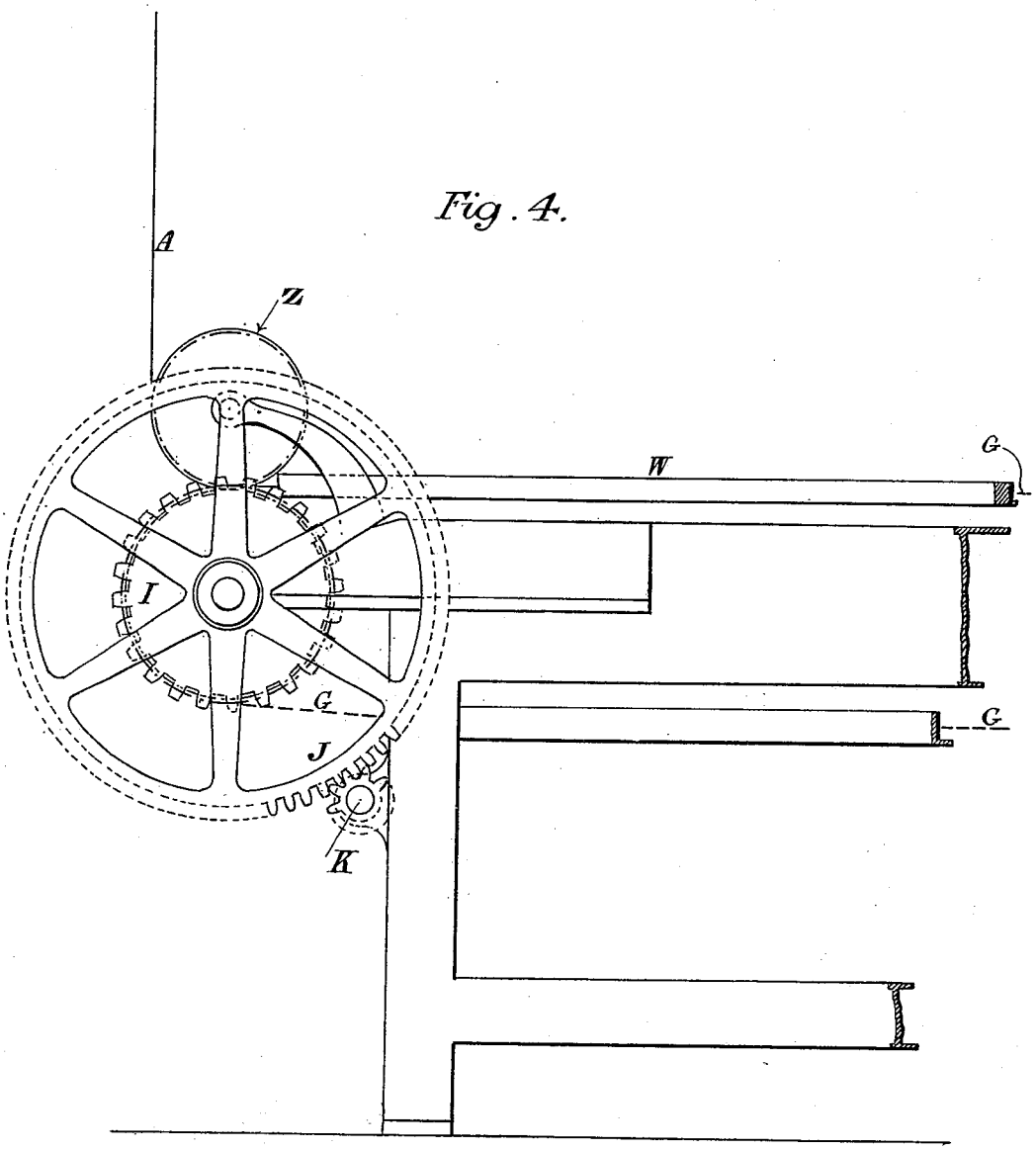
Figure 5:
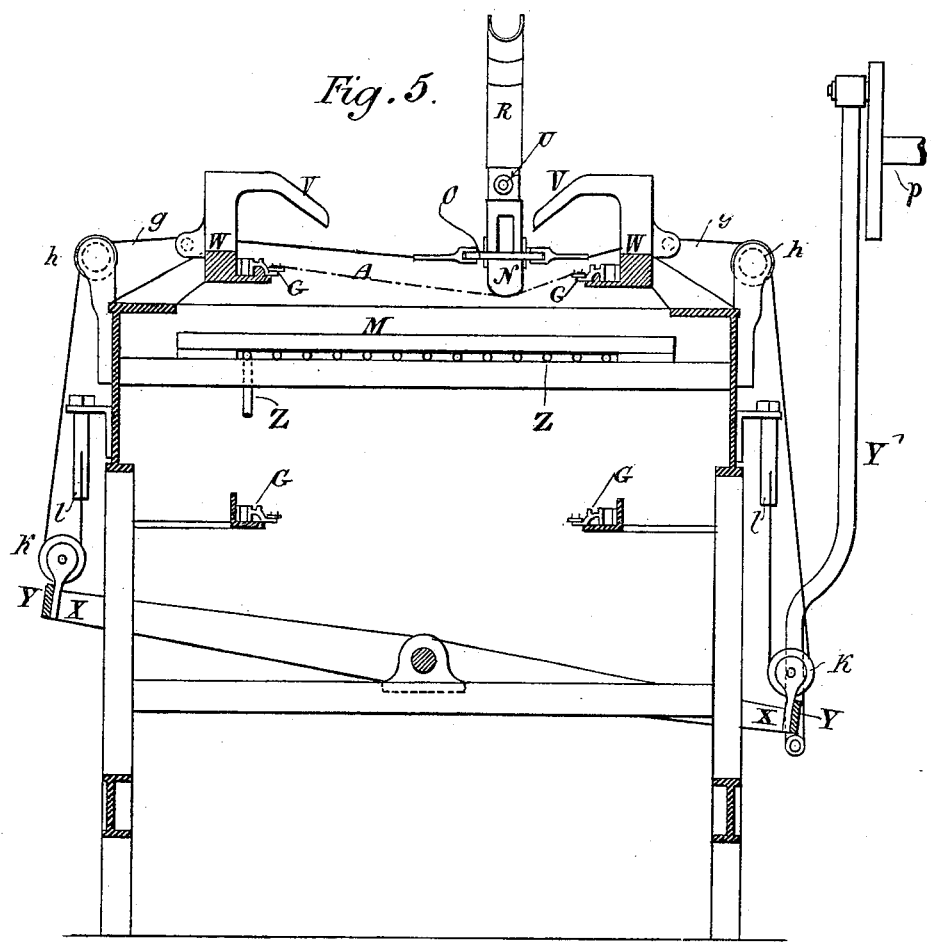
Figure 6:
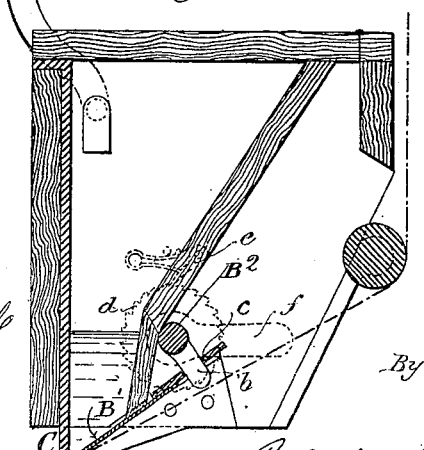
Figure 7:
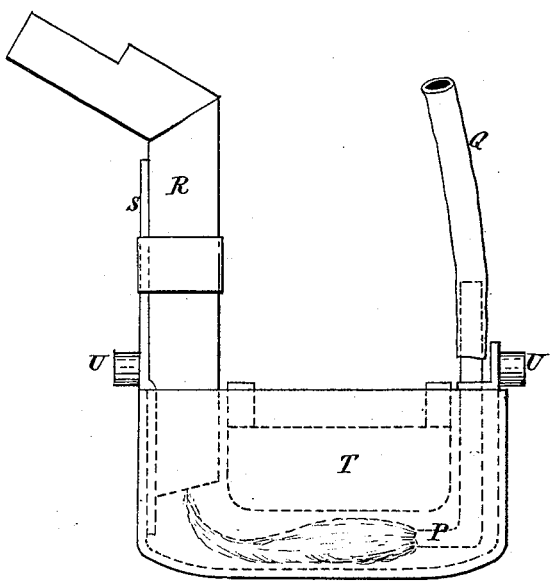
Figure 8:
Figure 10:
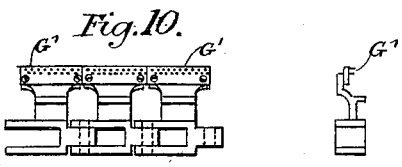
Figure 9:
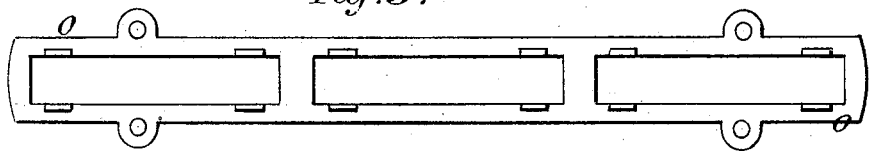

Figure 1 shows a side view, on a small scale, of the machine. Fig. 2 shows on a larger scale a side view of a portion of that end of the machine at which stiffening is applied onto the back of the fabric. Fig. 3 is a side view, on the larger scale, of that portion of the machine at which irons are passed to and fro across the back of the piece. Fig. 4 is a side view of the end of the machine from which the finished fabric is led away. Fig. 5 is a cross-section of that part of the machine at which the irons are traversed to and fro across the back of the piece. Fig. 6 is a longitudinal section, on a larger scale, of the trough from which stiffening is applied to the back of the fabric. Fig. 7 is a side view, and Fig. 8 a cross-section, of one of the irons. Fig. 9 is a plan view of one of the frames which embrace the irons and traverse them to and fro across the back of the piece. Fig. 10 shows a portion of one of the endless chains to which the selvages of the pile fabrics are attached to be carried through the machine.

A is the fabric, led face downward below the bottom of the trough B, containing the stiffening.

C is the knife or scraper which spreads the stiffening upon the back, all excess passing off over the edges of the fabric into funnels D, which conduct it into a cistern, E, from whence it is raised by a pump, F, worked by a crank, $a$, or otherwise, and returned back again into the trough B.

B' is a sliding valve, by which the outlet from the bottom of the trough can be adjusted. It can be moved toward or away from the knife C by short arms $b$, projecting from an axis, $B^2$, and entering slots $c$, formed in it. On the axis is a ratchet-wheel, $d$, with which a pawl engages to keep the valve at any desired distance away from the knife C. The valve can be moved backward away from the knife by giving a partial turn to the axis $B^2$ by means of a lever-handle, $f$, (shown in dotted lines in Fig. 6,) on its end.

G G are two endless chains, one at each side of the machine. At the entrance end of the machine they pass over wheels H just in front of the trough B, and at the opposite or delivery end of the machine they pass over wheels I, the axis of which receive a slow continuous revolving motion by a toothed wheel, J, upon it, being driven by a pinion on a driving-shaft, K. In this way a continuous traveling motion is given to the chains G. The fabric, after being conducted below the bottom of the trough B, has its selvages laid onto spikes G', which stand up from the links of the chains G, as shown at Fig. 10. The selvages are pressed down onto these spikes by india-rubber rollers L. The rollers L turn upon pins carried by the framing of the machine. The fabric is conveyed onward by these chains for some yards over plates M, heated by steam or otherwise, by means of pipes $z$ in any usual manner, not necessary to be described and illustrated in detail.

N are irons heated internally by gas. They rest on the back of the fabric, and are pulled to and fro across it by frames O, which embrace them. In the interior of each iron is a gas-burner, P, supplied with gas through a flexible gas-supply pipe, Q. The products of combustion pass off through the chimney R.

S is a rod to which the chimney is tied to steady it.

T is a weight to make the iron sufficiently heavy.

U are rollers carried by pins at each end of the iron. Each time that the iron is drawn up to either one side or the other of the piece the rollers U come against inclines V, fixed to bars W, which serve as supports for the endless chains G. The bars W are secured by brackets to the framing of the machine. In this way the irons are lifted up from off the piece and are prevented from striking against the pins which stand up from the endless chains. The way in which the irons are moved to and fro across the piece is best seen in Fig. 5.

Each iron, as above stated, drops down through a hole in the frame O. There are two such frames O, each having three holes through it for three irons. Each frame O has attached to each of its two sides two straps. One pair of straps, $q$, is conducted over guide-rollers $h$ and around pulleys $k$ at one end of levers X, and are then fixed to the framing of the machine, as at I. The other pair of straps is in like manner conducted around pullies $k$ at the opposite end of the levers X and secured to the framing. The levers at one of their ends are all connected together by a bar, Y, which is jointed to a rod, Y', to which an up-and-down motion may be given by a crank, $p$, or in any other usual manner. Thus as the levers X are rocked the irons are drawn to and fro across the piece. At the delivery end of the machine the piece passes under a roller, Z, and, passing partly around this roller, is led upward and conveyed away from the endless chains.

We claim—

1. The combination of the trough, with outlet at the bottom for applying stiffening in volume to the back of pile fabrics, the spreading-knife, and the irons heated by gas, and means for drawing them to and fro across the back of the fabric to iron the back, and means for holding and feeding the cloth, substantially as described.

2. The combination of the trough, adjustable valve, and spreading-knife for applying stiffening in volume to the back of pile fabrics, and the cistern for receiving the excess of stiffening, and pump for raising such stiffening back again from the cistern into the trough, substantially as described.

S. C. LISTER.
J. REIXACH.

Witnesses:
H. F. KILLICH,
   *Notary Public, Bradford.*
WILLIAM THORNTON,
   *Solicitor's Clerk, Bradford.*